United States Patent [19]

Osawa et al.

[11] Patent Number: 4,614,215
[45] Date of Patent: Sep. 30, 1986

[54] PNEUMATIC TIRES FOR HIGH-SPEED RUNNING TYPE MOTORCYCLES

[75] Inventors: Toru Osawa, Urawa; Yoichi Kitazawa, Higashiyamato, both of Japan

[73] Assignee: Bridgestone Tire Co., Ltd., Tokyo, Japan

[21] Appl. No.: 618,304

[22] Filed: Jun. 6, 1984

Related U.S. Application Data

[63] Continuation of Ser. No. 454,293, Dec. 29, 1982, abandoned.

[30] Foreign Application Priority Data

Mar. 29, 1982 [JP] Japan ............................ 57-44352[U]

[51] Int. Cl.$^4$ ........................... B60C 9/06; B60C 9/20; B60C 9/30
[52] U.S. Cl. .................................... 152/527; 152/537; 152/538; 152/556; 152/559; 152/564
[58] Field of Search ........... 152/352 R, 353 R, 353 C, 152/353 G, 354 R, 354 RB, 355, 356, 357, 361 R, 361 FP, 361 DM, 454, 526, 527, 535, 537, 538, 548, 556, 558–559, 564

[56] References Cited

U.S. PATENT DOCUMENTS

| | | | |
|---|---|---|---|
| 4,202,393 | 5/1980 | Ikeda et al. | 152/354 R |
| 4,215,734 | 8/1980 | Suzuki et al. | 152/361 R |
| 4,215,735 | 8/1980 | Sato | 152/354 R |
| 4,284,116 | 8/1981 | Sato et al. | 152/354 R |
| 4,390,052 | 6/1983 | Mendiola et al. | 152/356 R |

Primary Examiner—Lois E. Boland
Attorney, Agent, or Firm—Sughrue, Mion, Zinn, Macpeak & Seas

[57] ABSTRACT

A pneumatic tire for high-speed running type motorcycles is disclosed, which comprises a carcass of a bias structure composed of at least two plies each containing organic fiber cords, a tread portion of rubber, a breaker disposed between the carcass and tread and composed of at least one ply containing organic fiber cords, and a side portion of rubber. In the pneumatic tire, the carcass and breaker are arranged in substantially parallel with each other, and the carcass has a cord angle of 26°–36° with respect to the equatorial plane of the tire, and the breaker has a cord angle of 0°–25° with respect to the equatorial plane and extends at a width corresponding to 30–200% of the tread width.

2 Claims, 1 Drawing Figure

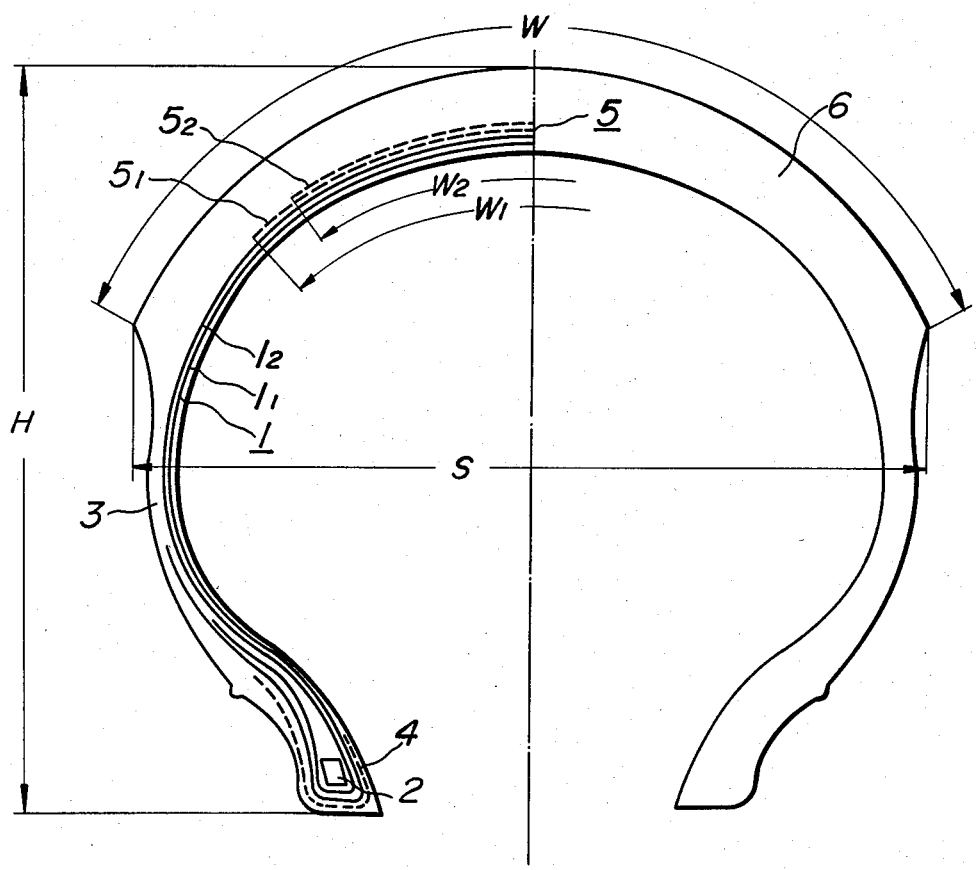

PNEUMATIC TIRES FOR HIGH-SPEED RUNNING TYPE MOTORCYCLES

This application is a continuation of application Ser. No. 454,293 filed Dec. 29, 1982 now abandoned.

BACKGROUND OF THE INVENTION

This invention relates to pneumatic tires for motorcycles, particularly high-speed running type motorcycles. More particularly, it relates to a pneumatic tire for motorcycle having improved high-speed durability.

In general, this type of the tire comprises a carcass of a so-called bias structure wherein at least two plies each containing organic fiber cords therein are crossed with each other at a cord angle of 26°–36° with respect to the equatorial plane of the tire, and a tread portion of rubber superimposed about a crown region of the carcass. The rubber thickness of the tread portion is substantially equal over the crown region, so that the surface of the tread portion has a substantially parallel relation to the contour of the carcass along such contour.

Recently, the tendency for high-speed running of vehicles has increased with the development of road networks, particularly with the opening of expressways accompanied with the perfection of paved roads. This tendency is also true in case of motorcycles. As a result, a requirement exists to improve the high-speed durability of the tire.

In case of high-speed running type motorcycles, there is a difference in the tire size between the front wheel and the rear wheel as compared with the case of four-wheeled passenger vehicles, so that the balance of cornering stability between the front and rear wheels is a significant subject.

The conventional tire for motorcycle as described above is apt to produce separation failure between the tread portion, particularly tread central region and the carcass under an influence of a strong centrifugal force when the tire is subjected to high-speed running, particularly a super high-speed running test for assuring ordinary performances of the tire, whereby it is obliged to considerably reduce the high-speed durability.

Heretofore, it has been attempted to apply the belt reinforcement, particularly steel cords usually used in tires for passenger cars to the tire for motorcycles in order to control the aforementioned centrifugal force. Contrary to expectations, however, high-speed durability is not so improved and inversely, cornering stability in the high-speed running, particularly cornering at high speed is deteriorated considerably.

The inventors have made various investigations and experiments in order to improve high-speed durability without sacrificing cornering stability in pneumatic tires for high-speed running type motorcycles and found that this object is effectively achieved by a tire reinforcing construction based on a new conception relating to a carcass of a bias structure and an arrangement of a breaker surrounding the carcass. As a result the invention has been accomplished.

According to the invention, there is provided a pneumatic tire for motorcycles comprising a carcass composed of at least two rubberized plies each containing organic fiber cords therein, the cords of which being crossed with each other at an inclination angle with respect to the equatorial plane of the tire, a tread portion of rubber extending over the crown region of said carcass along the contour thereof at a substantially equal thickness, a breaker disposed between said carcass and tread and composed of at least one rubberized ply containing organic fiber cords therein, and a side portion of rubber covering both sides of said carcass, the improvement wherein said carcass and breaker are arranged in substantially parallel with each other, said carcass has a cord angle of 26°–36° with respect to the equatorial plane, and said breaker has a cord angle of 0°–25° with respect to the equatorial plane and extends at a width corresponding to 30–200% of the width of said tread portion.

In the preferred embodiment of the invention, the breaker has a width corresponding to 50–80% of the tread width, the breaker is composed of two cord plies crossed with each other, the cords constituting the breaker have substantially the same properties as that of the carcass, the cord angle of the breaker is within a range of 10°–20° with respect to the equatorial plane, the coating rubber for the breaker is the same as that of the carcass, the breaker is substantially arranged in direct contact with the carcass, and the tread portion extends over the actual maximum width of the tire.

According to the invention, it is necessary that the tread portion has the substantially equal thickness extending over the crown region of the carcass along the contour thereof. This is due to the following fact; that is, when the body of the motorcycle is inclined toward the cornering side during the running, a so-called camber angle or an inclination angle of the equatorial plane of the tire with respect to a plane perpendicular to horizontal plane is given to the tire, whereby a camber thrust is produced to the tire. In order to always and smoothly produce camber thrusts under various camber angles, it is necessary that a distance from the carcass contour to the surface of the tread portion is really constant over the actual crown region of the carcass. For this reason, it is also necessary that the breaker disposed on the carcass and developing the composite reinforcing effect with the carcass is arranged in substantially parallel with the carcass.

The cord angle of the carcass should be within a range of 26°–36°, which is somewhat smaller than the conventionally used cord angle, in view of the harmony with the cord angle of the breaker of 0°–25°, preferably 10°–20°. When the cord angle of the breaker is larger than 25°, a so-called hoop effect to the carcass is reduced, while the bending rigidity in the radial plane of the tire increases, so that it is disadvantageous in the high-speed durability and cornering stability.

In the arrangement of the breaker, the width of the breaker should be 30–200%, preferably not less than 50% to the width of the tread portion. When the breaker width is smaller than 30%, the extension of the carcass in radial direction cannot be sufficiently suppressed. Moreover, the breaker width of not less than 80% contributes to increase the rigidity of the side portion of the tire, so that the widening of the breaker up to 200% advantageously produces a composite reinforcing effect with the carcass.

BRIEF DESCRIPTION OF THE DRAWING

The invention will now be described with reference to the accompanying drawing, wherein:

A single FIGURE is a schematic radial section of an embodiment of the pneumatic tire according to the invention.

DESCRIPTION OF THE PREFERRED EMBODIMENT

The FIGURE illustrates an embodiment of the pneumatic tire for high-speed running type motorcycle according to the invention, wherein the illustration of internal reinforcements for the tire is omitted in the right half radial section.

Reference numeral 1 is a carcass composed of two rubberized cord plies $1_1$ and $1_2$. Reference numeral 2 is a bead core, around which are turned the two cord plies $1_1$ and $1_2$ from the inside to the outside so as to extend the turnup end of the ply $1_1$ into rubber of a side portion 3 over the turnup end of the ply $1_2$. Reference numeral 4 is a chafer arranged outside the turnup portion of the carcass 1.

A breaker 5 is superimposed about a crown region of the carcass 1. In the illustrated embodiment, the breaker 5 is composed of two rubberized cord plies $5_1$ and $5_2$ having widths $W_1$ and $W_2$, respectively, as measured along the contour of the carcass and disposed between the carcass and rubber of a tread portion 6 having a substantially equal thickness over the crown region of the carcass along the contour thereof. The tread rubber 6 extends at a width W as measured along the surface thereof between the side portions 3. Moreover, S represents a maximum width of the tire and H represents a tire height.

In the sectional construction as described above, the carcass 1 has a bias structure wherein two cord plies $1_1$ and $1_2$ each containing nylon cords of 1,260 d/2 inclined at an angle of 30° with respect to the equatorial plane are crossed with each other, while the breaker 5 has a laminate structure wherein the two cord plies $5_1$ and $5_2$ each containing the same nylon cords as used in the carcass 1 inclined at an angle of 15° with respect to the equatorial plane are piled one upon the other so as to cross them with each other. In the breaker 5, the width $W_1$ of the cord ply $5_1$ is wider than the width $W_2$ of the cord ply $5_2$, and these widths $W_1$ and $W_2$ correspond to 60% and 50% of the width W of the tread portion, respectively.

Then, tires having sizes of 350H19 4PR for front wheel and 130/90-17 68H for rear wheel were manufactured as a test tire according to the above tire construction. For the comparison, control tires A and B were manufactured each having the same carcass as used in the test tire but with the breaker different from that of the test tire. That is, the breaker of the control tire A had a bias laminated structure of two cord plies each containing steel cords with a strand structure of 3×4×0.12 mm and a cord angle of 30°, whose widths correspond to 60% and 50% of the width W of the tread portion, while the breaker of the control tire B had the same structure as in the test tire except that the cord angle was 30°. The high-speed durability and cornering stability were measured with respect to these three tires to obtain results as shown in the following Table.

|  |  | Test conditions |  | Control tire B | Control tire A | Test tire |
| --- | --- | --- | --- | --- | --- | --- |
| High-speed durability |  | Internal pressure: 3.0 kgf/cm² Load front wheel 234 kgf rear wheel 315 kgf | Speed was raised from 180 km/hr at a rate of 10 km/hr every 10 minutes | 100 Separation was produced between the tread and the breaker at a center of the crown region | 80 Separation was produced between the tread and the breaker at a center of the crown region, and also separation was produced at the end of the breaker | 135 no trouble |
| Cornering stability | straight running | Internal pressure: front wheel 2.0 kgf/cm² rear wheel 2.2 kgf/cm² | Evaluation by feeling at a maximum speed of 210 km/hr | 100 | 90 there were weak points in the road gripping and vibration | 102 |
|  | cornering | Load riding alone | circuit course of 4.3 km | 100 | 80 poor in the road gripping property, and uneven in the turning | 100 |

Note:
Each property is indicated by an index on the basis that the control tire B is 100.

According to the invention, the substantially equal results can be obtained by using polyester cord, rayon cord, Kevlar (trade name) cord or the like as a cord for the carcass and breaker instead of nylon cord as described above. Furthermore, similar results are obtained by using an odd number of cord plies for the carcass, or by using a combination of different materials as the cord plies for the carcass, or by using a combination of different cords for the carcass and breaker. However, it is preferable to use the same cord material and coating rubber in the carcass and breaker.

As apparent from the embodiment of applying the special cord arrangement of the cord ply in the breaker according to the invention to the test tire for rear wheel, bias tires having a small aspect ratio H/S can easily be manufactured without sacrificing necessary tire performance, so that the invention is very advantageous. In the cord arrangement of the breaker, after the carcass is shaped into a toroidal form, one or several cords may be helically wrapped around the crown region of the carcass as a breaker before the vulcanization of a tread rubber arranged thereon.

According to the invention, the durability of the pneumatic tire for motorcycle under high-speed running can be improved considerably without sacrificing cornering stability in the straight running and cornering states.

What is claimed is:

1. A pneumatic tire for high-speed running type motorcycles comprising; a toroidal carcass composed of at least two rubberized plies each containing nylon cords therein, the cords of which being crossed with each other at an inclination angle of 30° with respect to the equatorial plane of the tire, a tread portion of rubber extending on the crown region of said carcass along the contour thereof at a substantially equal thickness over the actual maximum width of the tire, a breaker disposed between said toroidal carcass and tread and aligned with said toroidal carcass over the width of the breaker adjacent to said toroidal carcass and composed of plural rubberized plies containing nylon cords crossed with each other, a side portion of rubber covering both sides of said toroidal carcass, said toroidal carcass and said breaker arranged substantially in parallel with each other, said breaker having a cord angle of 10°–20° with respect to the equatorial plane and extending at a width corresponding to 50–80% of the width (W) of said tread portion, the cord plies of said breaker covered with substantially the same coating rubber as the cord plies of the carcass.

2. A pneumatic tire according to claim 1, wherein the cord ply of said breaker is substantially arranged in direct contact with the cord ply of said carcass.

* * * * *